United States Patent
Chen et al.

(10) Patent No.: US 10,750,383 B2
(45) Date of Patent: Aug. 18, 2020

(54) METHOD OF PROVIDING MANAGEMENT AND CONTROL OF HOTSPOTS WITH REDUCED MESSAGING

(71) Applicant: ARRIS Enterprises LLC, Suwanee, GA (US)

(72) Inventors: Jianxiang Chen, Shenzhen (CN); Yuanhai Tang, Shenzhen (CN); Hong Zhou, Shenzhen (CN); Haijuan Wen, Shenzhen (CN); Zhiyong Dong, Shenzhen (CN)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 15/835,831

(22) PCT Filed: Jul. 7, 2017

(86) PCT No.: PCT/CN2017/092256
§ 371 (c)(1),
(2) Date: Dec. 8, 2017

(87) PCT Pub. No.: WO2019/006751
PCT Pub. Date: Jan. 10, 2019

(65) Prior Publication Data
US 2020/0162943 A1    May 21, 2020

(51) Int. Cl.
*H04W 24/04*    (2009.01)
*H04W 76/19*    (2018.01)

(52) U.S. Cl.
CPC ........... *H04W 24/04* (2013.01); *H04W 76/19* (2018.02)

(58) Field of Classification Search
None
See application file for complete search history.

(56) References Cited

U.S. PATENT DOCUMENTS

| 9,485,196 | B1* | 11/2016 | Sankaran | ............... H04L 49/15 |
| 9,622,143 | B1* | 4/2017 | Sankaran | ............. H04W 76/12 |
| 9,763,078 | B1* | 9/2017 | Zheng | .................... H04W 8/12 |
| 2005/0177515 | A1* | 8/2005 | Kalavade | .......... H04W 12/0608 |
| | | | | 705/52 |

(Continued)

FOREIGN PATENT DOCUMENTS

| WO | 2013185717 A2 | 12/2013 |
| WO | 2015100874 A1 | 7/2015 |

OTHER PUBLICATIONS

PCT International Search Report & Written Opinion, Re: Application No. PCT/CN2017/092256, dated Mar. 28, 2018.

*Primary Examiner* — Otis L Thompson, Jr.
(74) *Attorney, Agent, or Firm* — Wenderoth, Lind & Ponack, L.L.P.

(57) ABSTRACT

Methods, systems, and computer readable media are operable to reduce the messaging needed for efficient control of hotspot activities. A database associating hotspots, their hosting broadband home gateways and their Wireless Access Gateways (WAGs) is developed by a monitor that inspects traffic to and from the access points. The monitor provides a WAG monitoring services to the broadband home gateways that reduces the amount of network traffic, while still allowing broadband access gateways to appropriately enable to disable their hotspots with the corresponding condition of the associated WAGs.

11 Claims, 6 Drawing Sheets

(56) References Cited

U.S. PATENT DOCUMENTS

| | | | | |
|---|---|---|---|---|
| 2006/0198349 A1* | 9/2006 | Ng | H04W 92/24 | 370/338 |
| 2008/0192638 A1* | 8/2008 | Massiera | H04W 36/30 | 370/237 |
| 2011/0250875 A1* | 10/2011 | Huang | H04W 4/026 | 455/418 |
| 2011/0250901 A1* | 10/2011 | Grainger | H04W 4/021 | 455/456.1 |
| 2011/0321142 A1* | 12/2011 | Chiang | H04L 12/66 | 726/5 |
| 2012/0115512 A1* | 5/2012 | Grainger | H04W 52/0229 | 455/456.3 |
| 2014/0185580 A1* | 7/2014 | Fang | H04W 16/14 | 370/330 |
| 2014/0348152 A1* | 11/2014 | Vanderhulst | H04W 4/00 | 370/338 |
| 2015/0237519 A1* | 8/2015 | Ghai | H04L 63/0428 | 380/270 |
| 2015/0237527 A1* | 8/2015 | Knutson | H04L 61/203 | 726/4 |
| 2016/0105883 A1* | 4/2016 | Ghai | H04L 12/66 | 370/329 |
| 2016/0234212 A1 | 8/2016 | Huang et al. | | |
| 2016/0277909 A1* | 9/2016 | Salvador | H04W 68/02 | |
| 2017/0230905 A1* | 8/2017 | Pularikkal | H04W 12/0609 | |
| 2019/0098556 A1* | 3/2019 | Johnson | H04W 48/02 | |

* cited by examiner

600

METHOD OF PROVIDING MANAGEMENT AND CONTROL OF HOTSPOTS WITH REDUCED MESSAGING

TECHNICAL FIELD

This disclosure relates to management and control of hotspot systems with reduced messaging.

BACKGROUND

Multiple System Operators (MSOs), also known as cable companies, as well as other service providers have been expanding their service offering to include wireless services, including hotspot services. Hotspot services allow a subscribing customer to access the Internet from a mobile device when they are away from their home. An extensive system is required for hotspot operation, including broadband home gateways or access points to provide the local wireless connection, as well as a Wireless Access Gateway (WAG) that provides hotspot management services, such as authentication, authorization, DHCP services, and others.

A hotspot service may be offered to a consumer through a wireless access point. The access point might stand alone, but more commonly service providers add wireless access points to broadband home gateways. Management of hotspot services is currently distributed. The access point associated with a broadband home gateway may be configured based on the broadband home gateway's configuration data. Management of the hotspot client services may be managed separately by a WAG.

The WAG is responsible for hotspot management functions, including admission and authentication of hotspot client devices. The WAG also provides Dynamic Host Configuration Protocol (DHCP) services for hotspot clients. Traffic to and from the hotspot clients passes through the WAG. For example, the broadband home gateway encapsulates the hotspot data coming from hotspot clients then passes the traffic back to the hotspot's WAG.

When a gateway initially connects to a broadband access network using a cable modem, it first performs a local DHCP request for an IP address, then retrieves its cable modem configuration file. One part of the configuration file may cover configuration of any internal access points, including any hotspot configuration. The hotspot configuration data typically includes information allowing the gateway to communicate with the WAG associated with that hotspot. Once a gateway has received information about how to contact the WAG and how to set up the hotspot's traffic routing tunnels, it sets up the tunnels with the WAG.

A gateway may be instructed by the WAG to periodically contact the WAG to confirm to both sides that the tunnel is operational. One example of confirmation traffic is a PING. PINGs are well known in the art as a simple IP protocol message exchange that confirms a network path exists between the device initiating the PING and the target device to which the PING was sent. Because of the large number of gateways that may connect to a single WAG, the communications path between a population of broadband gateways with hotspot services enabled and the WAG managing them may be congested with confirmation traffic. Therefore, a need exists for improving methods and systems of management and control of hotspot systems with reduced messaging.

SUMMARY

In embodiments, the method to reduce messaging may begin by receiving an indication of hotspot activation in a message destined for a broadband access gateway, wherein the message indicates a status of the hotspot and a WAG associated with the hotspot. The association between the WAG and the broadband access gateway, communication parameters for the WAG, and the indicated state of the hotspot can be stored for later use. Periodically, the status of at least one network connection to the WAG can be verified. If the status of the WAG indicates a partial or full communication failure, the associated broadband access gateway may be notified, which may in turn result in a suspension of the hotspot service on the gateway that was associated with the failed WAG.

This embodiment may use a DHCP response from the WAG as the message destined for the broadband access gateway. The periodic verification of the status of the WAG's network connection may be accomplished using a PING message to the WAG and monitoring the response; sending a DHCP request to the WAG and monitoring the response; or monitoring the WAG's traffic to at least one broadband gateway.

An apparatus may monitor broadband access gateway messages to determine the broadband access gateway's hotspot configuration information, including the access gateway's hotspot status, associated WAG and information to communicate with the WAG. The apparatus may periodically use that stored information to monitor the WAG's communication status and notify the access gateway if any communication problems arise. Similarly, computer readable media may be operable to instruct a processor to perform similar functions.

BRIEF DESCRIPTION OF THE DRAWINGS

Like reference numbers and designations in the various drawings indicate like elements.

DETAILED DESCRIPTION

As a preliminary matter, it will be readily understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention. Accordingly, while the present invention has been described herein in detail in relation to preferred embodiments, it is to be understood that this disclosure is only illustrative and exemplary of the present invention and is made merely for the purposes of providing a full and enabling disclosure of the invention. The following disclosure is not intended nor is to be construed to limit the present invention or otherwise to exclude other embodiments, adaptations, variations, modifications and equivalent arrangements, the present invention being limited only by the claims appended hereto and the equivalents thereof.

Figure 1:
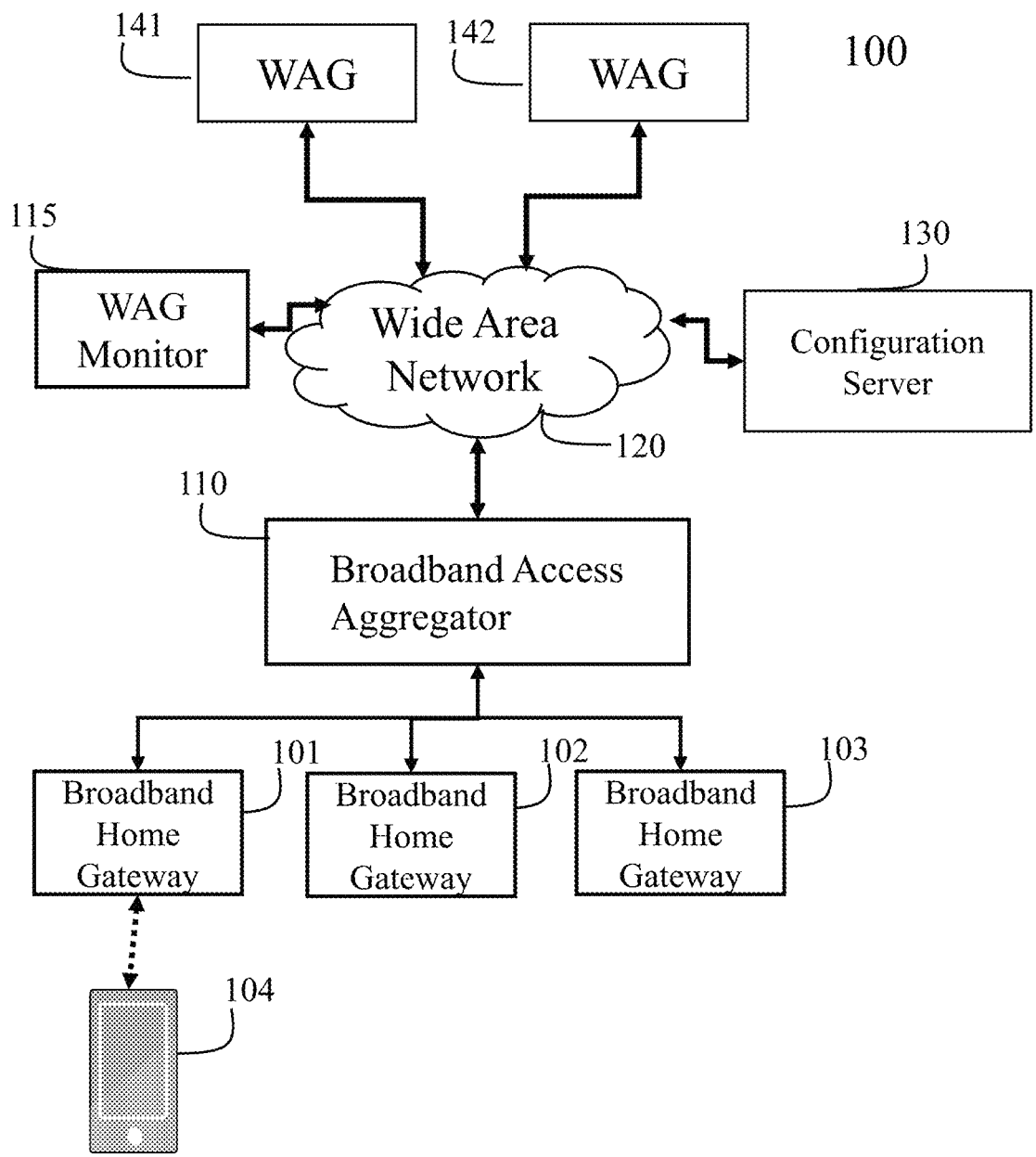
FIG. 1 is a block diagram illustrating an example network environment used for the management of hotspots.

FIG. 1 is a block diagram illustrating an example network 100 used for the improved management and control of hotspots.

A broadband home gateway device 101 may provide video and/or data services to a subscriber. In particular, gateway device 101 may provide one or more hotspot services. A mobile device 104 may connect to one of the hotspot services supported by broadband home gateway 101.

The home gateway devices 101 through 103 are supported by broadband access aggregator 110. In embodiments, aggregator 110 might be a CMTS (Cable Modem Termination System), a DSLAM (Digital Subscriber Loop Access Multiplexor) or an OLT (Optical Line Terminal). The aggregator generally aggregates traffic to and from the gateways 101-103.

The Wide Area Network (WAN) 120 provides network connection between network elements such as broadband access aggregators 110, WAGs 141-142, and other servers such as WAG monitor 115 and configuration server 130. Diverse technologies are known in the art to make up a WAN 120 including Ethernet, fiber connections, satellite and other wireless connections.

Configuration server 130 can provide gateways 101-103 with configuration information, such as services authorized for the user, security settings, and other similar items of configuration information. Hotspot configuration information can be included in the configuration information.

WAGs 141 and 142 provide management services for at least the hotspots provided by gateways 101-103 to their respective users. Hotspot traffic is typically routed through a WAG. A network environment 100 may have a plurality of WAGs connected to broadband home gateways 101-103 through a WAN 120 and a broadband access aggregator 110. A single broadband home gateway 101-103 may support multiple hotspot services, each supported by a separate WAG 141-142. For network robustness, a hotspot service may be supported by multiple WAGs that can each support a part of the total load coming from the broadband home gateways.

The WAG monitor 115 may intercept traffic between WAG 141-142 and the broadband home gateway 101-103 traveling over WAN 120. In embodiments, WAG monitor 115 may be integrated into the broadband access aggregator 110, or it may be an independent element within the WAN 120. Technology, such as deep packet inspection, well known to one skilled in the art of network management, can enable a monitor device or process to separate WAG/Gateway traffic from the other traffic.

Figure 2:
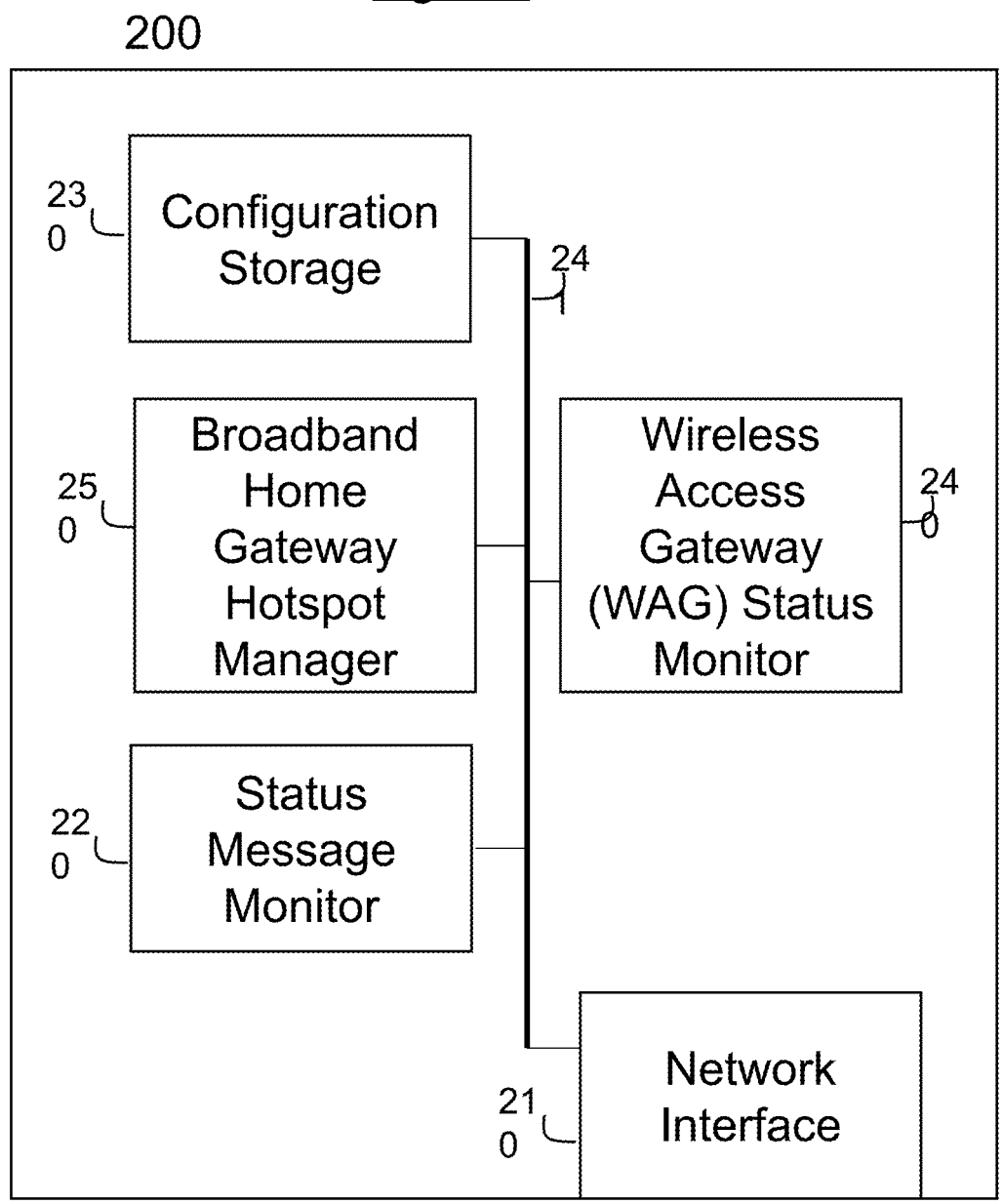
FIG. 2 is a block diagram illustrating the modules within a WAG monitor operable to support reduced network messaging.

FIG. 2 is a block diagram illustrating the modules within a WAG monitor 200 operable to support reduced network messaging.

A network interface 210 provides communications support for WAG Monitor 200. The network interface is connected to exemplary illustrated modules 220, 230, 240 and 250 in the WAG Monitor 200 through bus 241 and transmits and receives communications onto the WAN. Many different technologies may be accommodated within a network interface such as Ethernet, wireless, or fiber optics.

A status message monitor module 220 analyzes messages sent from the WAN that may relate to hotspot or WAG status. In embodiments, the status message monitor may receive traffic sent from a deep packet inspection device within the WAN. The status message monitor module 220 determines if a message contains information relating a broadband access gateway with a WAG, information about the configuration of a broadband access gateway's hotspot, or information about a WAG's communication parameters. If the message contains configuration information relating to broadband access gateway hotspots, including any WAG information, the status message monitor 220 checks if that information is already stored in configuration storage 230. If the information does not exist, or is different, the monitor 220 updates the configuration storage 230 with that information. In embodiments, the information may include: WAG-Hotspot association, broadband access gateway-Hotspot association, broadband access gateway-WAG association, contact information for broadband access gateways and/or WAGs (IP address or URL for example), WAG status, most recent update time for WAG status.

Configuration storage 230 holds the configuration information determined by the status message monitor module 220. The format of the information may vary depending upon the source. Status message monitor 220 may record information directly taken from intercepted messages, or it may deduce information based upon the message content.

The WAG status monitor module 240 acts periodically to confirm the current status of the WAGs being monitored. In embodiments, the WAG status monitor 240 may use messages intercepted by the status message monitor 220. In embodiments, WAG status monitor 240 may use timers update to reflect the last known activity of a WAG being monitored. For example, the WAG status monitor may reset a timer to zero to track the last known activity by each WAG being monitored. If a timer reaches a configured threshold, WAG status monitor 240 may send messages to a WAG, such as a PING, and record status updates based on the response(s), if any or update the status timer associated with the WAG.

The broadband home gateway hotspot manager module 250 acts to update the broadband home gateways with WAG status so that direct status messaging from the broadband home gateways to the WAGs can be avoided. If WAG status monitor 240 updates configuration storage 230 indicating that a WAG's network connection has failed, the hotspot manager 250 determines from data stored in configuration storage 230 the broadband home gateways affected by that WAG outage and collects contact information for the broadband home gateways. Hotspot manager 250 then uses network interface 210 to communicate the WAG outage to the affected broadband home gateways. Some gateways may elect to shut down the affects hotspot, others may offer reduced services.

Figure 3:
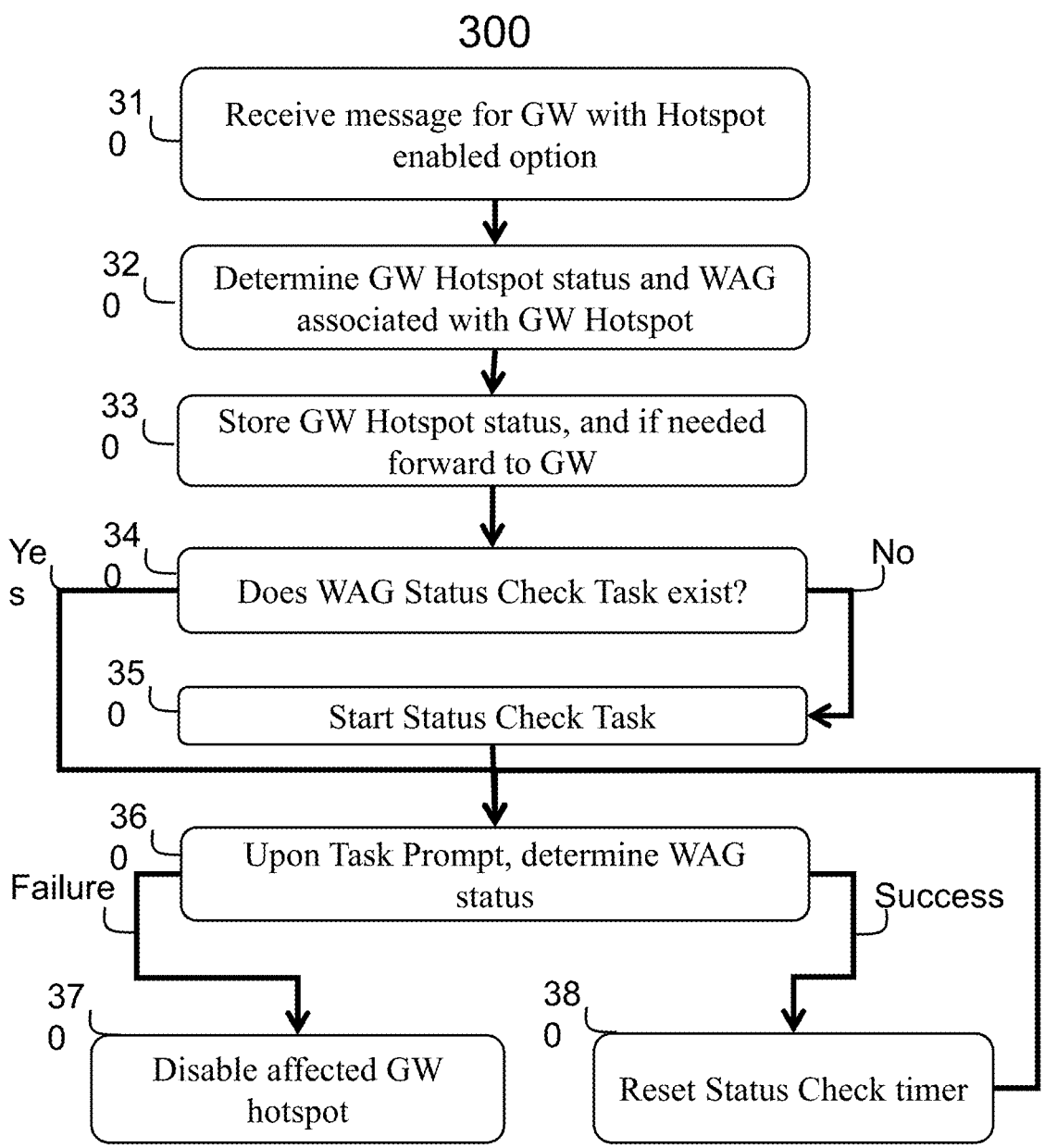
FIG. 3 is a flow chart illustrating an example process operable to manage and control hotspot systems with reduced messaging.

FIG. 3 is a flow chart illustrating an example process 300 operable on WAG monitor 115 to reduce the messaging activity for hotspot management.

At 310, the process may begin when a message is received by WAG monitor 115 destined for a home gateway capable of providing hot spot services indicating that the home gateway's hotspot is or should be enabled. The message may indicate either implicitly or explicitly the WAG controlling the home gateway's hotspot. In embodiments, the message may be a DHCP response that includes a hotspot-enabled option within the DHCP option fields provided by the WAG controlling the home gateway's hotspot. In other embodiments, the message may be part of a configuration file retrieved from a configuration server that includes information about the WAG controlling the home gateway's hotspot service. In embodiments, the indication of the home gateway's hotspot status may include a configuration field that explicitly enables hotspot service. In another embodiment, it may be an informational field echoing a status that the WAG received from the home gateway. It should be noted that a home gateway may support multiple hotspots controlled by a plurality of WAGs.

At 320, the status of the home gateway hotspot is determined from the message, and the WAG associated with the home gateway hotspot is also determined. In embodiments, the status of the home gateway hotspot may be determined from the content of the message, such as the presence of specific configuration data. In other embodiments, the status of the home gateway hotspot may be determined from the presence of the message. In embodiments, the WAG associated with the home gateway hotspot may be determined from a configuration field in the message. In other embodiments, the message headers, such as the source IP address, may allow the determination of the home gateway hotspot's associated WAG.

At 330, the home gateway hotspot service status indication may be stored locally by WAG monitor 115 for later reference, and the original message may be forwarded to the original target home gateway. Storing the status indication may also update a database record corresponding to the target home gateway. In other embodiments, storing the status indication may add a new entry to a table of active home gateway hotspots supported by a particular WAG.

At 340, WAG monitor 115 checks if the WAG determined from the message is already being monitored by checking for the existence of a WAG status check task. The process then continues to step 350 if the WAG is not yet being monitored, or to step 360.

At 350, after determining in step 340 that this WAG is not being monitored, WAG monitor 115 starts a status check task for that WAG. In embodiments, the status check task may use periodic status checks initiated by a monitor period timer. In embodiments, the timer may be started to count down to a target or count up to a target. In other embodiments, the status check task may also be track when a message is received from the WAG being monitored which would indicate that the WAG is still operational and has good network connectivity.

At 360, if the WAG status check task already exists or after WAG monitor 115 starts a WAG status check task, WAG monitor 115 may wait for a prompt from the status check task before checking the current status of the WAG. In embodiments, the procedure for checking the current status may take an active or passive form. WAG monitor 115 may monitor network traffic for WAG-originated traffic, such as responses to DHCP requests. The procedure may incorporate an active element alternatively or additionally. An active form for the current status check may use one or more PINGs. In other embodiments, an active form of checking the current status may use an alternative message exchange designed to indicate to WAG monitor 115 that the target WAG is still in operation with sufficient network connectivity to support normal operation. For example, a series of data requests may be sent to the WAG being evaluated. The timing of the WAG responses may be analyzed to indicate delay and jitter parameters that translate to WAG network performance.

At 370, if the determination in 360 was that the WAG or its network connectivity has probably failed, WAG monitor 115 may indicate to the affected home gateway that the hotspot should be disabled because a status check failure indicates that WAG was no longer capable of supporting the home gateway's hotspot. In embodiments, a single WAG outage may affect many home gateways. WAG monitor 115 may update all affected home gateways to disable hotspot service. In another embodiment, the WAG outage may be a partial outage reflecting a decreased capability. If WAG monitor 115 has determined that the WAG has a decreased operational capability, WAG monitor 115 may select a portion of the population of affected home gateways to disable that is less than a complete shutdown of all potentially affected home gateways.

At 380, if the WAG status task in step 360 indicated that the WAG was performing normally, WAG monitor 115 may reset the status check timer and wait return to step 360.

Figure 4:
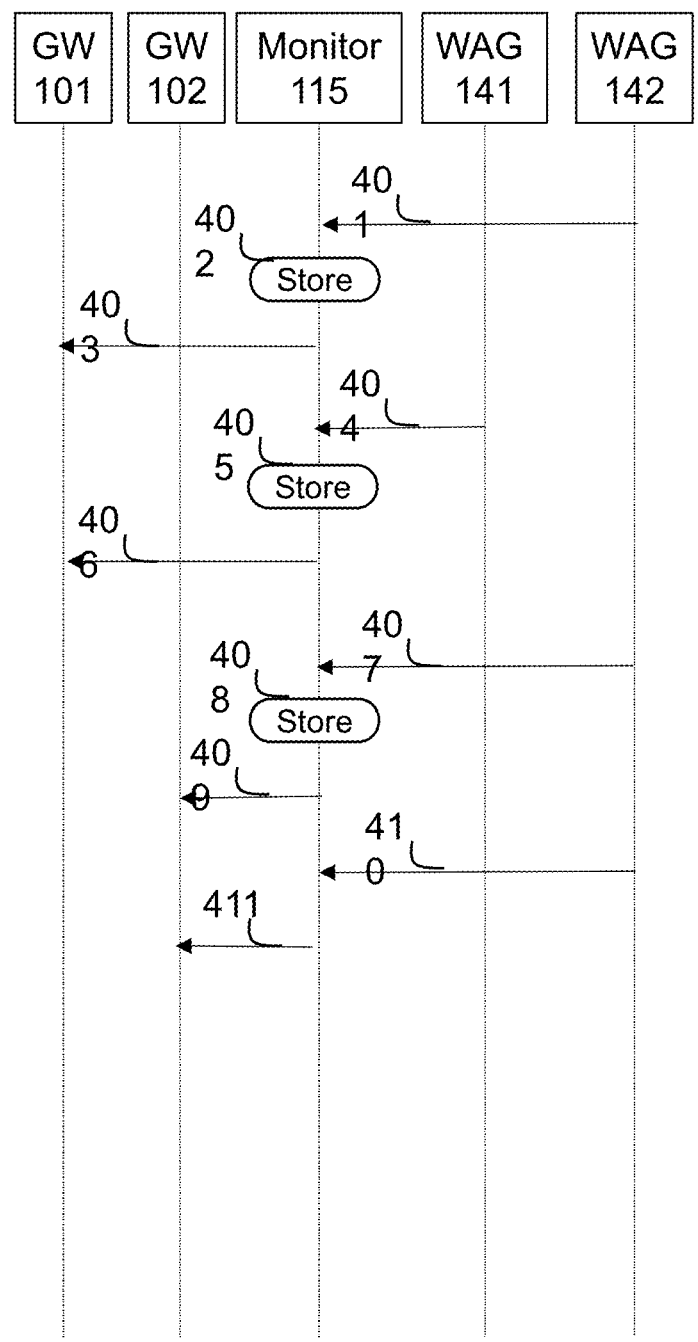
FIG. 4 is a message flow diagram illustrating an example process operable to manage and control hotspot systems with reduced messaging.

Turning to the message flow diagram of FIG. 4, example message flows 400 illustrate exemplary interactions between home gateways 101 and 102, a WAG monitor 115 and WAGs 141 and 142 that serve to form the database of home gateway to WAG connections within WAG monitor 115. WAG Monitor 115 receives a message 401 from WAG 142 that contains a Hotspot enabling indication for home gateway 101. In embodiments, WAG monitor 115 may be a separate device, or it may be a task running in a larger device supporting other functions or features. As discussed earlier, a hotspot enabling indication may be a configuration field explicitly enabling hotspot functionality on a home gateway, or it may be an indirect indication such as a status acknowledgement from the WAG.

Action 402 indicates that WAG monitor 115 will store the association information between home gateway 101 and WAG 142 as well as the hotspot state indicated by message 401. If a timer already exists setting a monitor period for WAG 142, that timer may be reset as a result of message 401. If no timer exists tracking the status of WAG 142, then a new timer will be created and set to an appropriate monitor period.

Message 403 contains message 401 forwarded by WAG monitor 115 to home gateway 101. While messages and storage actions are shown in a certain order in this flow diagram, it would be well understood by a person skilled in the art that this order of operations may be flexible. In embodiments, WAG monitor 115 may send message 403 before storing status information in action 402.

Similarly, as shown with messages 404 and 406 and storage action 405, WAG 141 may also indicate to home gateway 101 to enable a second distinct hotspot. In embodiments, WAG monitor 115 may then associate WAG 141 and WAG 142 with home gateway 101.

WAG Monitor 115 may also receive a message 407 from WAG 142 that contains a hotspot enabling indication for home gateway 102. Action 408 indicates that WAG monitor 115 will store the association information between home gateway 102 and WAG 142 as well as the hotspot state indicated by message 407. Message 409 may contain message 407 forwarded by WAG monitor 115 to home gateway 102.

If another message was received by WAG monitor 115 from WAG 142 containing a hotspot enabling indication after message 407, WAG monitor 115 may forward it to home gateway 102 in message 411 but no additional storage action is required, since the association between WAG 142 and home gateway 102 is already established within WAG monitor 115 by the previous message exchange. In embodiments, message 410 may trigger a reset of a status check timer since successful receipt of the message indicates a functional path between WAG 142 and WAG monitor 115 as well as that WAG 142 is in normal operation.

Figure 5:
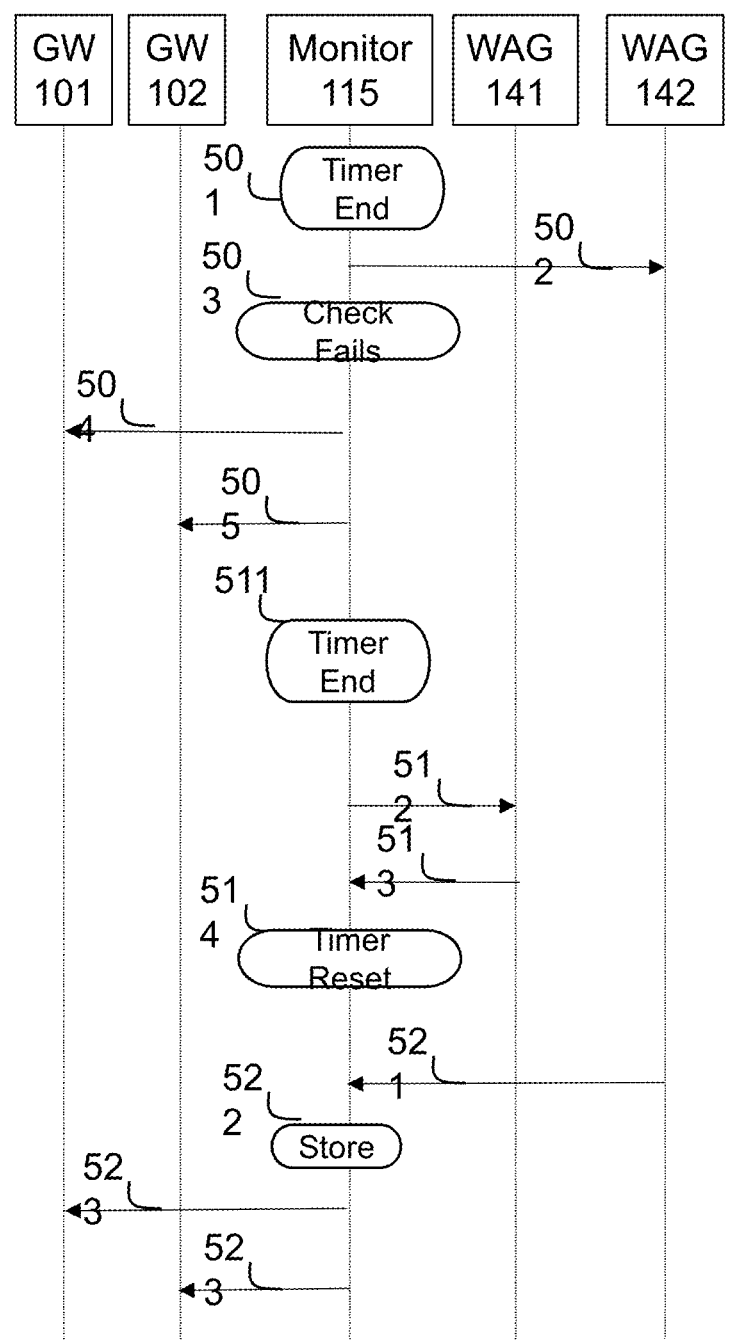
FIG. 5 is a message flow diagram illustrating an example process operable to manage and control hotspot systems with reduced messaging during failure and recovery scenarios.

Turning to FIG. 5, message flow 500 illustrates potential message interactions between home gateways 101 and 102, a WAG monitor 115 and WAGs 141 and 142 operable to reduce messaging for hotspot operation as compared to prior art operation. The devices in this message flow retain the labels from FIG. 3 for continuity and illustrate further aspects of operation based upon the transactions shown in FIG. 3.

Action 501 marks the end of a status check task timer on WAG monitor 115 for WAG 142. WAG Monitor 115 sends message 502 to WAG 142 for status verification. As discussed earlier, one skilled in the art may appreciate that many message exchanges may be used to verify that WAG 142 is still operational and that a viable communication path still exists between monitor 115 and WAG 142.

After a certain period of time, such as a standard PING timeout, monitor 115 may determine that the status check for WAG 142 has failed in action 503. In embodiments, that status failure may be determined by the lack of a response, or an explicit failure message from WAG 142 or other network elements not shown.

In response action 503, WAG monitor 115 may dispatch messages 504 and 505 to home gateways 101 and 102, respectively. In one embodiment, messages 504 and 505 may direct the receiving home gateway to suspend the hotspot service associated with WAG 142. In another embodiment, message 504 may direct home gateway 101 to disable the hotspot service associated with WAG 142, while message 505 may direct home gateway 102 to reduce the capabilities for the hotspot service associated with WAG 142, such as limiting the number of clients allowed to associate with the hotspot. Monitor 115 may take into account the current number of home gateways associated with a WAG to decide what actions to take in response to identifying a partial or complete WAG communication failure. Monitor 115 may also be configured with instructions of what actions to take for a WAG failure by another management entity, such as configuration server 130.

An alternative illustration of the messaging contemplated by this invention begins with WAG monitor 115's action 511, the completion of status check task timer for WAG 141. In response to action 511, WAG monitor 115 may send a status check message to WAG 141 shown by message 512. If an acceptable response 513 is received by WAG monitor 115 from WAG 141 within allowable time limits, then WAG monitor 115 may reset the status check timer in action 514.

An example recovery sequence is shown when WAG monitor 115 receives a message 521 from WAG 142 for home gateway 101, after WAG 142 had previously failed a status check at 503. When message 521 is received by WAG monitor 115 that is sufficient to indicate normal operation is restored to WAG 142, WAG monitor 115 may store that information in state 522. WAG Monitor 115 may also forward message 521 to its intended recipient, home gateway 101 in this example as message 523. WAG Monitor 115 may also notify home gateway 102 to reinstate normal operations in its hotspot that is associated with WAG 142.

Figure 6:
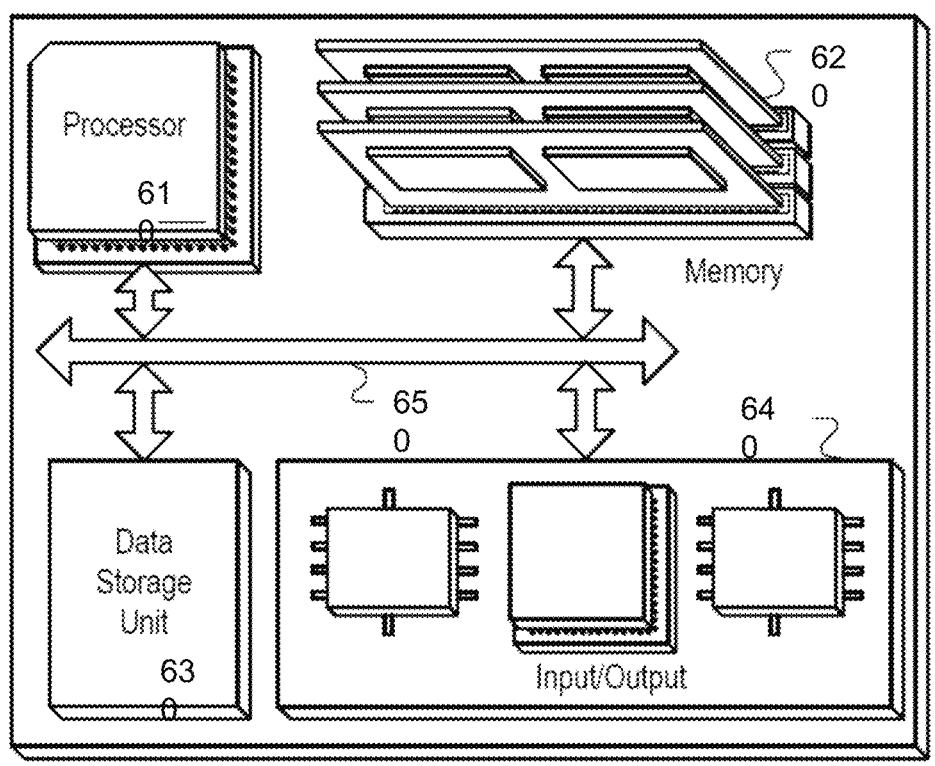
FIG. 6 is a block diagram of a hardware configuration operable to manage and control hotspot systems with reduced messaging.

FIG. 6 is a block diagram of a hardware configuration for a WAG monitor 600 operable to manage and control hotspot systems with reduced messaging. The hardware configuration 600 can include a processor 610, a memory 620, a storage device 630, and an input/output device 640. Each of the components 610, 620, 630, and 640 can, for example, be interconnected using a system bus 650. The processor 610 can be capable of processing instructions for execution within the hardware configuration 600. In one implementation, the processor 610 can be a single-threaded processor. In another implementation, the processor 610 can be a multi-threaded processor. The processor 610 can be capable of processing instructions stored in the memory 620 or on the storage device 630.

The memory 620 can store information within the hardware configuration 600. In one implementation, the memory 620 can be a computer-readable medium. In one implementation, the memory 620 can be a volatile memory unit. In another implementation, the memory 620 can be a non-volatile memory unit.

In some implementations, the storage device 630 can be capable of providing mass storage for the hardware configuration 600. In one implementation, the storage device 630 can be a computer-readable medium. In various different implementations, the storage device 630 can, for example, include a hard disk device, an optical disk device, flash memory or some other large capacity storage device. In other implementations, the storage device 630 can be a device external to the hardware configuration 600.

The input/output device 640 provides input/output operations for the hardware configuration 600. In one implementation, the input/output device 640 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for interacting with a router network (e.g., broadband access aggregator of FIG. 1, or other broadband traffic aggregation device), In another implementation, the input/output device can include driver devices configured to send communications to, and receive communications from one or more networks.

Those skilled in the art will appreciate that the invention described herein improves upon methods and systems for management and control of wireless hotspot activity of one or more access points supporting multiple radios. Methods, systems, and computer readable media may be operable to facilitate handling of hotspot client acquisition.

The subject matter of this disclosure, and components thereof, can be realized by instructions that upon execution cause one or more processing devices to carry out the processes and functions described above, such as the exemplary process described in FIG. 3. Such instructions can, for example, include interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method to manage a wireless network with a Wireless Access Gateway (WAG) and a hotspot comprising:
    receiving an indication of hotspot activity in a message destined for a broadband home gateway;
    determining from the message a status of a hotspot on the broadband home gateway and an association between a WAG and the broadband home gateway;
    storing the association between the WAG and the broadband home gateway and the indicated state of the hotspot;
    periodically verifying the status of a network connection to the WAG;
    and, upon determining that the network connection to the WAG has failed,
    notifying the broadband home gateway of the WAG failure based on the stored association.

2. The method of claim 1, wherein notifying the broadband home gateway of the WAG failure comprises: sending a message shutting down the hotspot associated with the failed WAG.

3. The method of claim 1, wherein the message destined for the broadband home gateway is a DHCP response from the WAG.

4. The method of claim 1, wherein periodically verifying the status of the network connection comprises:
    monitoring the WAG's responses to at least one broadband home gateway;
    resetting a network failure timer when WAG responses are detected; and
    making a failure determination when no WAG responses are detected within a monitor period.

5. The method of claim 4, further comprising:
    detecting that the network connection to the WAG has recovered; and
    notifying the broadband home gateway of the WAG's recovery.

6. An apparatus comprising:
    an interface configured to communicate with a network, wherein the network allows communication with broadband home gateways and WAGs;
    a memory configured to store hotspot configuration information including:
        a broadband home gateway's hotspot status,
        a broadband home gateway's associated WAG, and
        communication information associated with the WAG;
    one or more modules configured to:
    monitor messages for the broadband home gateway for hotspot configuration information;
    update hotspot configuration information if new information differs from that already stored;
    periodically verify the status of a network connection to the WAG; and,
    notify the broadband home gateway of the WAG failure upon determining that the network connection to the WAG has failed.

7. The apparatus of claim 6 wherein periodically verifying the status of the network connection comprises:
    monitoring the WAG's responses to at least one broadband home gateway;

resetting a network failure timer when WAG responses are detected; and, determining that a WAG failure has occurred if no WAG responses are seen within a monitor period.

8. A non-transitory computer readable media having instructions operable to cause one or more processors to perform the operations comprising:

receive an indication of hotspot activity in a message destined for a broadband home gateway;

determine from the message a status of a hotspot on the broadband home gateway and an association between a Wireless Access Gateway (WAG) and the broadband home gateway;

store the association between the WAG and the broadband home gateway and the indicated state of the hotspot;

verify periodically the status of a network connection to the WAG; and notify the broadband home gateway of the WAG failure upon determining that the network connection to the WAG has failed.

9. The non-transitory computer readable media of claim 8, wherein verifying periodically the status of the network connection comprises:

monitor the WAG's responses to at least one broadband home gateway, and reset a network failure timer when WAG responses are detected.

10. The non-transitory computer readable media of claim 8, wherein notifying the broadband home gateway of the WAG failure further comprises:

send a message to disable the broadband home gateway's hotspot.

11. The non-transitory computer readable media of claim 10, further comprising:

detect that the network connection to the WAG has recovered; and notify the broadband home gateway of the WAG's recovery.

* * * * *